United States Patent [19]

Dudash

[11] 4,420,841

[45] Dec. 13, 1983

[54] OPTICALLY COUPLED BIDIRECTIONAL TRANSCEIVER

[75] Inventor: Allan A. Dudash, Raleigh, NC

[73] Assignee: Westinghouse Electric Corp., Pittsburgh, Pa.

[21] Appl. No.: 268,223

[22] Filed: May 29, 1981

[51] Int. Cl.³ ............................................... H04B 9/00
[52] U.S. Cl. .................................... 455/607; 250/551; 455/602
[58] Field of Search ............... 455/601, 602, 606, 607, 455/608; 370/4; 250/551

[56] References Cited

U.S. PATENT DOCUMENTS

| 3,110,813 | 11/1963 | Sack, Jr. | 455/602 |
| 3,503,061 | 3/1970 | Bray et al. | 455/606 |
| 4,104,533 | 8/1978 | Iverson | 250/551 |
| 4,119,948 | 10/1978 | Ward et al. | 455/606 |
| 4,130,738 | 12/1978 | Sandstedt | 179/90 B |
| 4,178,504 | 12/1979 | Farmer | 455/602 |
| 4,207,557 | 6/1980 | Gilkerson et al. | 340/178 |

FOREIGN PATENT DOCUMENTS 1291992 10/1972 United Kingdom .
1330076 9/1973 United Kingdom .
1378648 12/1973 United Kingdom .

OTHER PUBLICATIONS

Ueno et al.-An Optical Fiber Cable Communication System Using Pulse-Interval Modulation-1st Euro. Conf. on Optical Fibre Comm., Sep. 16-18, 1975, pp. 156-158.

Judd et al.-Bidirectional Optical Isolator-IBM Tech. Disclosure Bulletin, vol. 22, #4, Sep. 1979, pp. 1671-1672.

Primary Examiner—Joseph A. Orsino, Jr.
Attorney, Agent, or Firm—D. R. Lackey

[57] ABSTRACT

A transceiver provides bidirectional optically isolated communication between two devices. A first output signal from the first device is input to the transceiver. Using parallel optical data links, an optical signal is generated in response to the first signal and is detected by a pair of light sensitive devices. These light sensitive devices cause a second signal, representative of the first signal, to be generated. The second signal is then conducted to the input terminal of the second device. In an alternate mode of operation, the transceiver receives a third signal from the second device. Using series optical data links, optical signals are generated in response to the third signal and are detected by light sensitive devices. These light sensitive devices cause a fourth signal, representative of the third signal, to be generated. The fourth signal is then conducted to the input terminal of the first device. A control circuit cooperates with the parallel and series optical links to enable one and inhibit the other dependent upon whether a signal is to be communicated to the second device from the first device, or to the first device from the second device.

10 Claims, 2 Drawing Figures

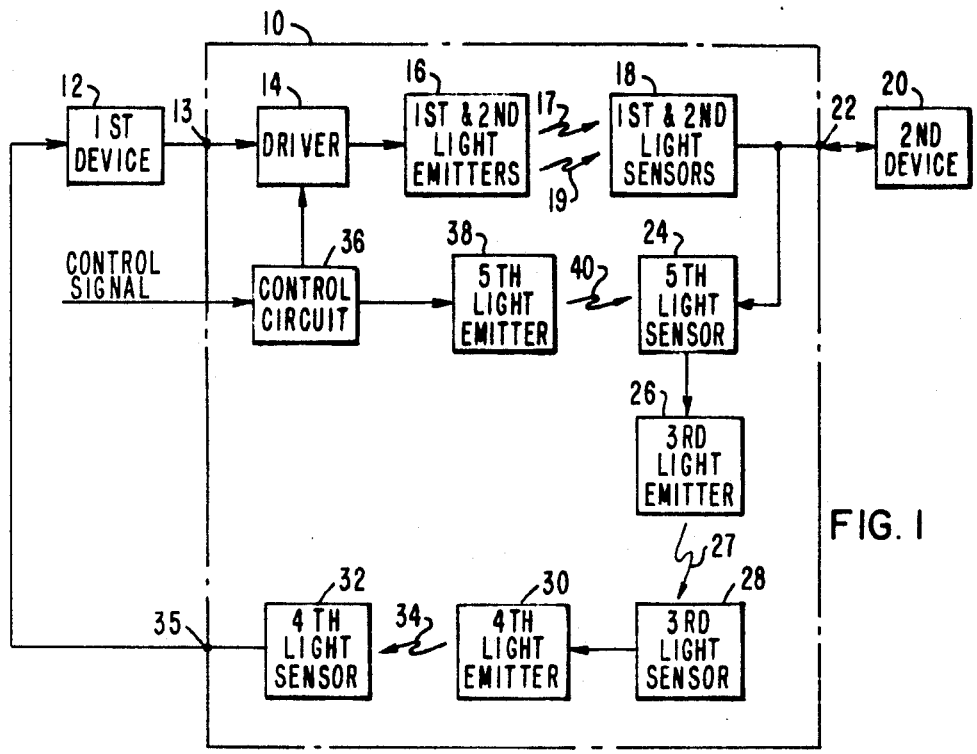
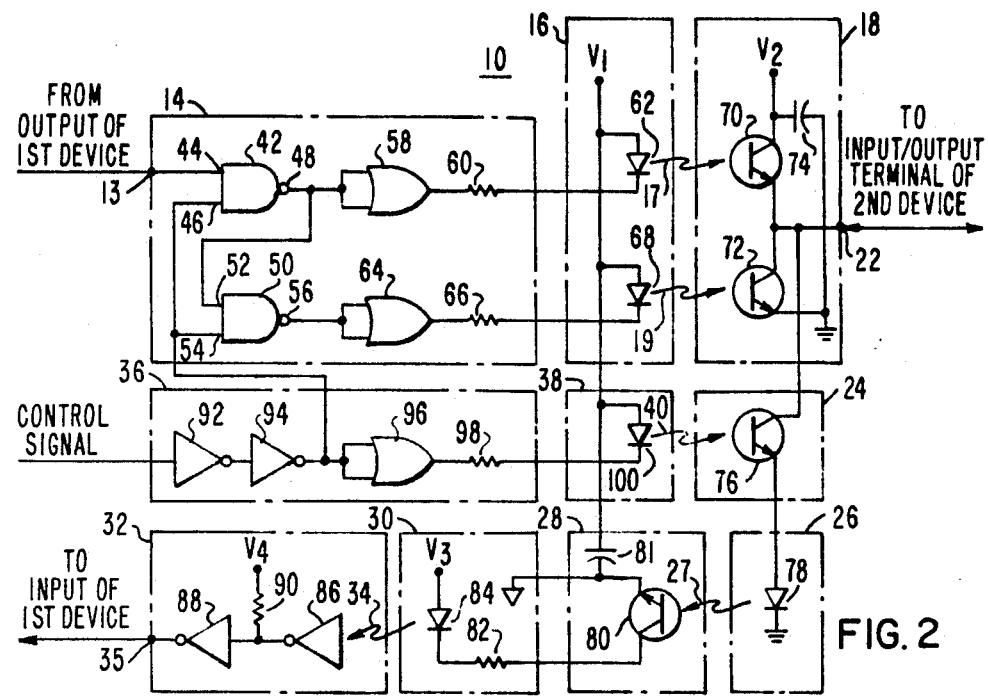
FIG. 1
FIG. 2

OPTICALLY COUPLED BIDIRECTIONAL TRANSCEIVER

BACKGROUND OF THE INVENTION

1. Field of the Invention:

This invention relates generally to bidirectional signal transceivers and, more specifically, to such transceivers providing isolated bidirectional digital communication.

2. Description of the Prior Art:

It is frequently necessary for a microprocessor to communicate with a device external to it, for example, a memory or a controller, via a bidirectional serial port of the microprocessor. The low signal levels employed make this configuration extremely sensitive to noise generated in the surrounding environment but, if the microprocessor and external device are located in proximity to each other, noise problems are substantially reduced. When, however, the application requires the microprocessor and external device be separated by an appreciable distance the noise causes substantial degradation of the signals. Accordingly, it is imperative for the effective use of such a microprocessor system that it be made immune to ambient noise.

A well-known and effective technique for overcoming noise problems, a least those of a common-mode nature, is to utilize optical coupling between the microprocessor and the external device. Of course, optical coupling can be used in any application where it is desired to electrically isolate two devices. In a unidirectional optically coupled system, an electrical signal causes emission of an optical signal representative thereof, the optical signal is detected and used to generate an electrical signal. In addition to enhancement of common mode noise rejection, the isolation afforded by optical coupling prevents problems associated with ground loops.

Depending on the application, communication between two optically coupled devices can be in a unidirectional or bidirectional mode. In unidrectional optical coupling the signal is communicated in one direction only, i.e., from device A (transmitting) to device B (receiving); there is no signal communication from device B to device A. Bidirectional communication requires both devices to receive and send signals. At times, device A will be transmitting and device B receiving, while at other times the situation will be reversed with device B transmitting and device A receiving.

Several prior art systems employ unidirectional optical coupling in a variety of applications. See, for example, U.S. Pat. No. 4,104,533 issued to Iverson; U.S. Pat. No. 4,207,557 issued to Gilkeson et al.; British Pat. No. 1,291,992 issued to Entrekin Computers Inc.; and British Pat. No. 1,330,076 issued to Landis and Gyr AG. As stated, each of these prior art techniques employs optical coupling in a single direction. The undirectional techniques employed in these prior art patents are not suitable for a bidirectional application as in the present invention, wherein one of the communicating devices has only a single terminal that alternately receives signals from and transmits signals to the other device.

Several bidirectional communication schemes are also disclosed in the prior art. See, for example, U.S. Pat. No. 3,503,061 issued to Bray et al.; U.S. Pat. No. 4,130,738 issued to Sandstedt; U.S. Pat. No. 4,119,948 issued to Ward et al.; British Pat. No. 1,378,648 issued to Computer Transmission Corporation; and U.S. patent application Ser. No. 891,997 which is assigned to the assignee of this invention and has been allowed. The common features of each of these bidirectional prior art references are: (1) Both of the communicating devices function in a transmit and a receive mode thereby providing bidirectional communication; (2) Communication between the two devices is via at least two separate optical paths wherein the first device transmits a signal to be received by the second device over a first path, and the second device transmits a signal to be received by the first device over a second path; (3) Each of the two communicating devices has separate input and output terminals for a total of four terminals.

The present invention also allows both communicating devices to operate in a transmit and a receive mode via two separate optical communication paths. However, one of the communicating devices has only a single bidirectional input/output terminal. That is, when this device is to function in the receive mode the bidirectional terminal serves as an input, and when this device is to operate in the transmit mode the bidirectional terminal serves as an output. Thus, the present invention allows bidirectional communication between devices not having matched or paired input and output terminals. These and other advantages of the present invention are discussed in detail below in the description of the preferred embodiment.

SUMMARY OF THE INVENTION

A transceiver providing isolated bidirectional digital communication is disclosed. The transceiver is connected between a first device and a second device capable of communicating with each other, wherein it is desired that the communication paths between these two devices be electrically isolated. This isolation is provided by the transceiver through the use of optoelectronic elements. The transceiver has an input terminal, an output terminal, and a bidrectional terminal. The transceiver receives an electrical signal from the first device via the input terminal. An optical signal, produced in response to this electrical signal, is transmitted by a light emitter and received by a light sensor. The detected optical signal causes generation of an electrical signal which is coupled to the second device via the transceiver's bidirectional terminal. In an alternate mode of operation, the transceiver receives a signal from the second device via the bidirectional terminal. Again, an optical signal is produced in response to this electrical signal, the optical signal is emitted by a light emitter, and detected by a light sensor which causes generation of an electrical signal. The electrical signal is coupled to the first device via the transceiver's output terminal. In addition, the transceiver has provisions for applying a control signal from an external source to determine the mode in which the transceiver is to operate.

BRIEF DESCRIPTION OF THE DRAWINGS

FIG. 1 is a block diagram of a transceiver constructed according to the teachings of the present invention; and FIG. 2 is an electrical schematic illustrating in detail the circuit elements of the transceiver.

DESCRIPTION OF THE PREFERRED EMBODIMENT

Turning to FIG. 1, a block diagram of a transceiver 10 constructed according to the teachings of the present invention is shown. The transceiver 10 is connected to a first device 12 via an input terminal 13 and an output terminal 35, and connected to a second device 20 via an input/output terminal 22. Both the first device 12 and the second device 20 are capable of alternately transmitting and receiving an electrical signal. The electrical signal received from the first device 12 is processed through a driver 14 followed by first and second light emitters 16. The first and second light emitters 16 produce optical signals in response to the electrical signal. These optical signals are communicated to first and second light sensors 18 via optical paths 17 and 19. The first and second light sensors 18 detect the optical signals, generating an electrical signal responsive thereto. This electrical signal is then input to the second device 20 via the input/output terminal 22 of the transceiver 10.

The transceiver 10 is also capable of operating in a reverse mode wherein an electrical signal is received from the second device 20 and transmitted by the transceiver 10 to the first device 12. In this mode of operation an electrical signal is received from the second device 20 by the transceiver 10 through the input/output terminal 22. This electrical signal is selectively conducted through a fifth light sensor 24, which acts as a switch, to a third light emitter 26. The third light emitter 26 produces an optical signal in response to the electrial signal. The optical signal is communicated to a third light sensor 28 via an optical path 27. The third light sensor 28 produces an electrical signal which is input to a fourth light emitter 30. The fourth light emitter 30 emits an optical signal in response to the electrical signal received by it. This optical signal is communicated to a fourth light sensor 32 via an optical path 34. In response to the received optical signal, the fourth light sensor 32 provides an electrical signal to the first device 12 via the output terminal 35 of the transceiver 10.

To determine its operating mode, the transceiver 10 receives a control signal, having a high state and a low state, from an external device or from the first device 12. The control signal is serially processed through a control circuit 36 and a fifth light emitter 38. In one embodiment, when the control signal is in its high state, the driver 14 will be enabled such that a data signal can be transmitted from the first device 12 to the second device 20. Also, when the control signal is high, the fifth light emitter 38 will not transmit an optical signal. The fifth light sensor 24 will therefore impose a high impedance between the second device 20 and the third light emitter 26 to effectively open this circuit and allow the second device 20 to receive signals transmitted by the first device 12 via input/output terminal 22. When the control signal is in its low state, the driver 14 is inhibited and the fifth light emitter 38 will transmit an optical signal to the fifth light sensor 24 via an optical path 40. Now the fifth light sensor 24 will be in a low impedance state allowing the second device 20 to cooperate with the third light emitter 26, to transmit electrical signals from the second device 20 to the first device 12.

In a preferred embodiment of this invention, the first device 12 is represented by a test instrument and the second device 20 is represented by a microprocessor-based watthour meter encoder (a device for converting the meter dial shaft positions to a train of binary pulses) having a single bidirectional terminal for communicating with the test instrument. The reader desiring a detailed discussion of an encoder should refer to U.S. patent application Ser. No. 252,682 filed Apr. 9, 1981. When it is necessary to separate the test instrument from the encoder by an appreciable distance ambient noise causes substantial signal degradation. The optical isolation provided by the present invention between the first device 12 and the second device 20 improves noise performance by eliminating common mode noise pickup. In addition, the isolation provided by the transceiver 10 prevents problems associated with ground loops and differences in the power supply voltages of the first device 12 and the second device 20. In this embodiment the driver 14, the fourth light emitter 30, the fourth light sensor 32, and the control circuit 36 are located at the test instrument. The remaining components of the transceiver 10 are located at the encoder and connected to the aforementioned components of the transceiver 10 with a length of cable.

FIG. 2 shows a detailed schematic diagram of the transceiver 10. An output signal from the first device 12 is coupled to an input terminal 44 of a NAND gate 42 via the input terminal 13 of the transceiver 10. An input terminal 46 of the NAND gate 42 is connected to an input terminal 54 of a NAND gate 50. An output terminal 48 of the NAND gate 42 is connected to an input terminal 52 of the NAND gate 50. The output terminal 48 is connected to both input terminals of a non-inverting current sinking driver 58. An output terminal of the non-inverting current sinking driver 58 is connected to a cathode terminal of a light emitting diode 62 via a resistor 60. An anode terminal of the light emitting diode 62 is connected to a DC voltage, $V_1$. Similarly, an output terminal 56 of the NAND gate 50 is connected to both input terminals of a non-inverting current sinking driver 64. The output terminal of the non-inverting current sinking driver 64 is connected to the cathode terminal of a light emitting diode 68 via a resistor 66. An anode terminal of the light emitting diode 68 is connected to the DC voltage $V_1$. With reference to FIG. 1, the NAND gates 42 and 50, the non-inverting current sinking drivers 58 and 64, and the resistors 60 and 66 form the driver 14. The light emitting diodes 62 and 68 constitute the first and second light emitters 16.

A phototransistor 70 is responsive to the light emitting diode 62 via the optical path 17, and a phototransistor 72 is responsive to the light emitting diode 68 via optical path 19. A collector terminal of the phototransistor 70 is connected to a DC voltage $V_2$; an emitter terminal of the phototransistor 70 is connected to a collector terminal of the phototransistor 72; an emitter terminal of the phototransistor 72 is connected to ground. The junction at the collector terminal of phototransistor 72 and the emitter terminal of the phototransistor 70 is connected to the input/output terminal 22 of the transceiver 10. A capacitor 74 is connected between the DC voltage $V_2$ and ground of the second device 20. The phototransistors 70 and 72 together with their associated components constitute the first and second light sensors 18 of the transceiver 10.

The input/output terminal 22 is connected to a collector terminal of a phototransistor 76; an emitter terminal of the phototransistor 76 is connected to an anode terminal of a light emitting diode 78. A cathode terminal of the light emitting diode 78 is connected to ground of the second device 20. The phototransistor 76 constitutes the fifth light sensor 24, and the light emitting diode 78 constitutes the third light emitter 26 of the transceiver 10.

A phototransistor 80 is responsive to the light emitting diode 78 via the optical path 27. An emitter terminal of the phototransistor 80 is connected to ground of the first device 12, and a collector terminal of the phototransistor 80 is connected to a cathode terminal of a light emitting diode 84 via a resistor 82. An anode terminal of the light emitting diode 84 is connected to a DC voltage $V_3$. The emitter terminal of the phototransistor 80 is also connected to the DC voltage $V_1$ via a capacitor 81. The phototransistor 80 and the capacitor 81 constitute the third light sensor 28 of the transceiver 10. The light emitting diode 84 and the resistor 84 form the fourth light emitter 30.

The light emitting diode 84 communicates with a photosensor 86 via the optical path 34. An output terminal of the photosensor 86 is connected to an input terminal of an inverter 88; the output terminal is also connected to a DC voltage $V_4$ via a resistor 90. The output terminal of the inverter 88 is connected to the input terminal of the first device 12 via the output terminal 35 of the transceiver 10. The photosensor 86, the inverter 88 and their associated components form the fourth light sensor 32 shown in FIG. 1.

The control signal for determining in which mode the transceiver 10 is to operate is input to an inverter 92. An output terminal of the inverter 92 is connected to an input terminal of an inverter 94. An output terminal of the inverter 94 is connected to the input terminal 54 of the NAND gate 50; the output terminal of the inverter 94 is also connected to both input terminals of a non-inverting current sinking driver 96. An output terminal of the non-inverting current sinking driver 96 is connected to a cathode terminal of a light emitting diode 100 via a resistor 98. An anode terminal of the light emitting diode 100 is connected to the DC voltage $V_1$. The inverters 92 and 94 and the non-inverting current sinking driver 96 together with their associated components constitute the control circuit 36 shown in FIG. 1. The light emitting diode 100 constitutes the fifth light emitter 38.

The transceiver 10 functions as follows. Assume the control signal input to the inverter 92 is in the high state. This allows the transceiver 10 to transmit a data signal from the first device 12 to the second device 20. With the control signal high, the output signal of the inverter 92 will be low, and the output signal of the inverter 94 will be high. The output signal from the non-inverting current sinking driver 96 will also be high resulting in no forward current applied to the light emitting diode 100. Since the light emitting diode 100 does not emit radiation when forward current is not flowing, the phototransistor 76 will be in a non-conducting state imposing a high impedance in the electrical path between the input/output terminal 22 and ground. Also, when the control signal is high, the input terminal 46 of NAND gate 42 and the input terminal 54 of NAND gate 50 are in a high state, i.e., both of these NAND gates are enabled by the high control signal. Therefore, when the data signal applied to the input terminal 13 from the first device 12 is high the output terminal 48 of the NAND gate 42 will be low. The output terminal of the non-inverting current sinking device 58 will also be low, forward biasing the light emitting diode 62. In this state, the light emitting diode 62 emits an optical signal which is coupled to the phototransistor 70 via the optical path 17. The optical signal causes the phototransistor 70 to conduct, thereby coupling the DC voltage $V_2$ to the input/output terminal 22 and causing the voltage at the input/output terminal 22 to go high. Note, when the output signal from the first device 12 is high, NAND gate 50 is inhibited by the low state of the input terminal 52 and light emitting diode 68 emits no optical signal. In this manner, a high output signal from the first device 12 is coupled to the input of the second device 20 via the NAND gate 42, the non-inverting current sinking driver 58, the light emitting diode 62, and the phototransistor 70.

If the control signal is high and the output data signal from the first device 12 is low, the signal at the output terminal 48 of the NAND gate 42 is in a high state. This enables the NAND gate 50 and causes the signal at the output terminal 56 to be low. The light emitting diode 68 is therefore forward biased, via the non-inverting current sinking driver 64, causing it to emit an optical signal. This optical signal is coupled, via the optical path 19, to the phototransistor 72 causing it to conduct. Conduction of phototransistor 72 drives the input/output terminal 22 to ground thereby causing a low signal to be applied to the input of the second device 20. When the output data signal from the first device 12 is low, the light emitting diode 62 has no forward current and therefore emits no radiation. In this manner, a low data signal from the output of the first device 12 is coupled to the input of the second device 20 via the NAND gate 50, the non-inverting current sinking driver 64, the light emitting diode 68, and the phototransistor 72.

Now assume the control signal is in a low state. The low state of the control signal will forward bias the light emitting diode 100 causing it to emit an optical signal which is coupled to the phototransistor 76 via the optical path 40. This optical signal causes the phototransistor 76 to conduct, providing a signal path for an output data signal received from the second device 20. Note also, that when the control signal is in a low state, the light emitting diode 62 will have no forward current because of the high state of the output terminal 48 of the NAND gate 42 and, the light emitting diode 68 will have no forward current because of the high state of the output terminal 56 of the NAND gate 50. The phototransistors 70 and 72 will therefore be in a non-conducting or open state. In this mode, if a high data signal is applied to the input/output terminal 22 from the second device 20 the data signal will pass through the phototransistor 76 and cause the light emitting diode 78 to be forward biased. The light emitting diode will therefore emit an optical signal coupled to the phototransistor 80 via the optical path 27. When the phototransistor 80 conducts, the light emitting diode 84 will be forward biased causing it to emit an optical signal coupled to the photosensor 86 via the optical path 34. The low data signal at the output terminal of the photosensor 86 is inverted by the inverter 88, causing a high signal to appear at the output terminal 35. Since the output terminal 35 is connected to the input terminal of the first device 12, a high signal has been coupled from the output terminal of the second device 20 to the input terminal of the first device 12.

If the control signal is low and the output signal of the second device 20 is low, it will cause the light emitting diode 78 to have no forward current. The phototransistor 80 will not conduct and the light emitting diode 84 will also have no forward current. The output signal of the photosensor 86 will also be high, causing the output signal from the inverter 88 to be low. This low signal is then applied to the input of the first device 12 via the output terminal 35. In this manner, a low output data signal from the second device 20 is transmitted to the first device 12.

Additional advantages of this invention can now be observed. Note that this device uses current mode communication. That is, all signal flow is via current loops which tend to have higher noise immunity resulting in better signal integrity. Also, use of the driver 14 allows large signal currents to flow through the light emitting diodes 62 and 68. These large signal currents cause the phototransistors 70 and 72 to reach very low impedances when light is emitted by the corresponding light emitting diode. These low impedances force the data signal at the input/output terminal 22 very close to ground (in the low state) or to the DC voltage $V_2$ (in the high state), thereby providing improved noise margins.

Briefly reviewing, a transceiver providing bidirectional isolated digitial communication between two devices is disclosed. The receiver provides optical coupling between the devices to reduce problems inherent with direct electrical connections. In one mode of operation, the transceiver receives an output signal from the output terminal of the first device and transmits it to a bidirectional terminal of the second device. In an alternate mode of operation, the transceiver receives a signal from the bidirectional terminal of the second device and transmits it to the input terminal of the first device. A provision for providing a control signal to the transceiver to determine its mode of operation is also provided.

What is claimed is:

1. A transceiver providing bidirectional optically isolated communication between a first device having input and output means for producing a first signal at the output means thereof, and a second device having input and output means for producing a second signal at the output means thereof, said transceiver comprising:
    driver means having first and second input terminals and an output terminal, and wherein said first input terminal is responsive to said first signal;
    first and second light emitter devices, said first and said second light emitter devices connected to said output terminal of said driver means;
    first and second light sensor devices in optical communication with said first and said second light emitter devices respectively, wherein said input means of said second device is connected to said first and said second light sensor devices, such that said first and said second light emitter devices and said first and said second light sensor devices provide parallel optical data links for transmitting said first signal from said first device to said second device;
    a third light emitter device having an input terminal;
    a third light sensor device in optical communication with said third light emitter device;
    a fourth light emitter device electrically connected to said third light sensor device;
    a fourth light sensor device in optical communication with said fourth light emitter device, wherein said input means of said first device is connected to said fourth light sensor device, such that said third and said fourth light emitter devices and said third and said fourth light sensor devices provide series optical data links for transmitting said second signal from said second device to said first device;
    means for producing a control signal having a first and a second state; and
    switching control means having first and second input terminals and first and second output terminals, wherein said first input terminal of said switching control means is responsive to said control signal, and wherein said second input terminal of said switching control means is responsive to said second signal, and wherein said first output terminal of said switching control means is connected to said second input terminal of said driver means, and wherein said second output terminal of said switching control means is connected to said input terminal of said third light emitter device, such that when said control signal is in said first state said first and said second light emitter devices are enabled, via said driver means, to transmit said first signal from said first device to said second device and said third light emitter device is disabled to prevent transmission of said second signal from said second device to said first device, and such that when said control signal is in said second state said first and said second light emitter devices are disabled to prevent transmission of said first signal from said first device to said second device and said third light emitter device is enabled and said second signal is coupled from said second input terminal of said switching control means to said input terminal of said third light emitter device, via said second output terminal of said switching control means, to transmit said second signal from said second device to said first device, thereby providing bidirectional optically isolated communication between said first and said second devices.

2. The transceiver of claim 1 including means for producing a first and a second DC voltage and wherein the first and second light emitter devices are responsive to said first DC voltage, and the first and second pair of light sensor devices are responsive to said second DC voltage.

3. The transceiver of claim 1 including means for producing a third DC voltage and wherein the fourth light emitter device and the third light sensor device are responsive to said third DC voltage.

4. The transceiver of claim 1 wherein the driver means includes a first NAND gate having a first input terminal, a second input terminal, and an output terminal, and a second NAND gate having a first input terminal, a second input terminal, and an output terminal, and wherein said first input terminal of said first NAND gate is responsive to the output means of said first device, said second input terminal of said second NAND gate and said second input terminal of said first NAND gate are responsive to the control signal, and said first input terminal of said second NAND gate is responsive to said output terminal of said first NAND gate.

5. The transceiver of claim 4 wherein the driver means further includes a first non-inverting current sinking driver having a first input terminal, a second input terminal, and an output terminal, and a second non-inverting current sinking driver having a first input terminal, a second input terminal, and an output terminal, and wherein said first and said second input terminals of said first driver are responsive to the ouput terminal of said first NAND gate, said first and said second input terminals of said second driver are responsive to the output terminal of said second NAND gate, said first light emitter device is responsive to said output terminal of said first driver, and said second light emitter device is responsive to said output terminal of said second driver.

6. The transceiver of claim 1 wherein the switching control means includes a first inverter having a input terminal, and an output terminal, a second inverter having an input terminal and an output terminal, and a non-inverting current sinking driver having a first input terminal, a second input terminal, and an output terminal, and wherein said input terminal of said first inverter is responsive to the control signal, said input terminal of said second inverter is responsive to said output terminal of said first inverter, said first and said second input terminals of said driver are responsive to said output terminal of said second inverter.

7. The transceiver of claim 6 wherein the switching control means includes a fifth light emitter device and a fifth light sensor device in optical communication with said fifth light emitter device, and wherein said fifth light emitter device is responsive to the output terminal of said driver.

8. The transceiver of claim 6 wherein the driver means is responsive to the output terminal of said second inverter.

9. The transceiver of claim 1 wherein the first light emitter device includes a first light emitting diode, and wherein the first light sensor device includes a first phototransistor, and wherein the second light emitter device includes a second light emitting diode, and wherein the second light sensor device includes a second phototransistor, and wherein the third light emitter device includes a third light emitting diode, and wherein the third light sensor device includes a third phototransistor, and wherein the fourth light emitter device includes a fourth light emitting diode, and wherein the fourth light sensor device includes a fourth phototransistor.

10. A transceiver providing bidirectional optically isolated communication between a first device having input and output means for producing a first signal at the output means thereof and a second device having bidirectional input/output means for producing a second signal, said transceiver comprising:

driver means having first and second input terminals and an output terminal, and wherein said first input terminal is responsive to said first signal;

first and second light emitter devices, said first and said second light emitter devices connected to said output terminal of said driver means;

first and second light sensor device in optical communication with said first and said second light emitter devices respectively, wherein said bidirectional input/output means of said second device is connected to said first and said second light sensor devices, such that said first and said second light emitter devices and said first and said second light sensor devices provide parallel optical data links for coupling said first signal from said first device to said second device;

a third light emitter device having an input terminal;

a third light sensor device in optical communication with said third light emitter device;

a fourth light emitter device electrically connected to said third light sensor device;

a fourth light sensor device in optical communication with said fourth light emitter device, wherein said input means of said first device is connected to said fourth light sensor device, such that said third and said fourth light emitter devices and said third and said fourth light sensor devices provide series optical data links for coupling said second signal from said second device to said first device;

means for producing a control signal having a first and a second state;

and switching control means having first and second input terminals and first and second output terminals, wherein said first input terminal of said switching control means is responsive to said control signal, and wherein said second input terminal of said switching control means is responsive to said second signal, and wherein said first output terminal of said switching control means is connected to said second input terminal of said driver means, and wherein said second output terminal of said switching control means is connected to said input terminal of said third light emitter device, such that when said control signal is in said first state said first and said second light emitter devices are enabled, via said driver means, to transmit said first signal from said first device to said second device and said third light emitter device is disabled to prevent transmission of said second signal from said second device to said first device, and such that when said control signal is in said second state said first and said second light emitter devices are disabled to prevent transmission of said first signal from said first device to said second device and said third light emitter device is enabled and said second signal is coupled from said second input terminal of said switching control means to said input terminal of said third light emitter device, via said second output terminal of said switching control means, to transmit said second signal from said second device to said first device, thereby providing bidirectional optically isolated communication between said first and said second devices.

* * * * *